US010583067B2

(12) United States Patent
Kline et al.

(10) Patent No.: US 10,583,067 B2
(45) Date of Patent: Mar. 10, 2020

(54) SOURCE-OF-SOUND BASED NAVIGATION FOR A VISUALLY-IMPAIRED USER

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 16/058,370

(22) Filed: Aug. 8, 2018

(65) Prior Publication Data
US 2020/0046595 A1  Feb. 13, 2020

(51) Int. Cl.
*A61H 3/06* (2006.01)
*G01C 21/36* (2006.01)

(52) U.S. Cl.
CPC .......... *A61H 3/061* (2013.01); *G01C 21/3652* (2013.01); *A61H 2003/063* (2013.01); *A61H 2201/5058* (2013.01)

(58) Field of Classification Search
CPC ............ A61H 3/061; A61H 2201/5058; A61H 2003/063; G01C 21/3652; G06F 3/165; G06F 2212/0132; G06F 12/0802; G06F 2212/1024; G06F 2212/145; G06N 99/05; H04R 29/00; G10L 25/51; G10L 25/78; G10L 13/00; G11B 2020/1062
See application file for complete search history.

(56) References Cited

U.S. PATENT DOCUMENTS

| 7,536,029 | B2 | 5/2009 | Choi et al. |
| 8,630,685 | B2 | 1/2014 | Schrage |
| 9,361,858 | B2 | 6/2016 | Oda |
| 9,389,431 | B2 | 7/2016 | Wall, III et al. |
| 9,430,954 | B1 | 8/2016 | Dewhurst |

(Continued)

OTHER PUBLICATIONS

M.O. Belardinelli et al.,"Sonification of Spatial Information: Audio-Tactile Exploration Strategies by Normal and Blind Subjects" Universal Access in HCI, Part II, HCII 2009, LNCS 5615, pp. 557-563, 2009.

*Primary Examiner* — Anne M Antonucci
(74) *Attorney, Agent, or Firm* — Cantor Colburn LLP; Tihon Poltavets

(57) ABSTRACT

User devices, methods, and computer-readable media are described for providing source-of-sound based navigation to a visually-impaired user. A sound detected at a user device of a visually-impaired user is categorized and an approximate location of a source of the sound is determined. A contextual analysis is performed based on the determined sound category such that the results of the contextual analysis indicate whether the visually-impaired user should be directed towards or away from the location of the sound source. An evacuation path is determined in those scenarios in which the user should be directed away from the detected sound and a tactile representation of the evacuation path is generated on a display of the visually-impaired user's device. A navigation path is determined in those scenarios in which the user should be directed towards the detected sound and a corresponding tactile representation thereof is generated.

20 Claims, 7 Drawing Sheets

(56) References Cited

U.S. PATENT DOCUMENTS

| | | | |
|---|---|---|---|
| 9,652,124 B2 | 5/2017 | Cotier et al. | |
| 2008/0170118 A1* | 7/2008 | Albertson | A61H 3/061 |
| | | | 348/46 |
| 2010/0277428 A1 | 11/2010 | Kumazawa | |
| 2011/0158417 A1 | 6/2011 | Lin | |
| 2011/0172907 A1 | 7/2011 | Rui Da Silva Freitas | |
| 2016/0019817 A1* | 1/2016 | Deokar | G08B 6/00 |
| | | | 340/4.12 |
| 2016/0202761 A1* | 7/2016 | Bostick | G06F 3/016 |
| | | | 345/174 |
| 2018/0078422 A1 | 3/2018 | Dierenbach | |
| 2018/0336000 A1* | 11/2018 | Vaughn | H04R 29/00 |

* cited by examiner ured to implement one or more example
SOURCE-OF-SOUND BASED NAVIGATION FOR A VISUALLY-IMPAIRED USER

BACKGROUND

The present invention relates generally source-of-sound based navigation, and more particularly, to source-of-sound based navigation for a visually-impaired user.

Mobile device use has become nearly ubiquitous over the past decade. Mobile device users include individuals with a range of abilities including individuals who are visually-impaired. Visually-impaired users may not be completely blind, but may have poor vision, often requiring a supporting mechanism such as a walking stick or a guide dog to assist with navigating public and private spaces.

Moreover, in some cases, a visually-impaired user may also be hearing-impaired, making navigation even more difficult. Existing navigation tools on mobile devices suffer from a number of drawbacks in connection with assisting visually-impaired users with navigation, particularly in public spaces. Technical solutions to such drawbacks are described herein.

SUMMARY

In one or more example embodiments, a computer-implemented method for providing source-of-sound based navigation is disclosed. The method includes detecting, at a user device, a sound in an environment and determining a location of a source of the sound. The method further includes identifying a sound category of the sound and performing, based at least in part on the sound category, a contextual analysis of the sound. The method additionally includes determining, based at least in part on the contextual analysis of the sound, that a visually-impaired user of the user device should be directed away from the location of the source of the sound and determining an evacuation path for directing the visually-impaired user away from the source of the sound. The method finally includes generating, on a display of the user device, a tactile representation of the evacuation path.

In one or more other example embodiments, a user device for providing source-of-sound based navigation is disclosed. The user device includes at least one memory storing computer-executable instructions and at least one processor configured to access the at least one memory and execute the computer-executable instructions to perform a set of operations. The operations include detecting, at a user device, a sound in an environment and determining a location of a source of the sound. The operations further include identifying a sound category of the sound and performing, based at least in part on the sound category, a contextual analysis of the sound. The operations additionally include determining, based at least in part on the contextual analysis of the sound, that a visually-impaired user of the user device should be directed away from the location of the source of the sound and determining an evacuation path for directing the visually-impaired user away from the source of the sound. The operations finally include generating, on a display of the user device, a tactile representation of the evacuation path.

In one or more other example embodiments, a computer program product for providing source-of-sound based navigation is disclosed. The computer program product includes a non-transitory storage medium readable by a processing circuit, the storage medium storing instructions executable by the processing circuit to cause a method to be performed. The method includes detecting, at a user device, a sound in an environment and determining a location of a source of the sound. The method further includes identifying a sound category of the sound and performing, based at least in part on the sound category, a contextual analysis of the sound. The method additionally includes determining, based at least in part on the contextual analysis of the sound, that a visually-impaired user of the user device should be directed away from the location of the source of the sound and determining an evacuation path for directing the visually-impaired user away from the source of the sound. The method finally includes generating, on a display of the user device, a tactile representation of the evacuation path.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
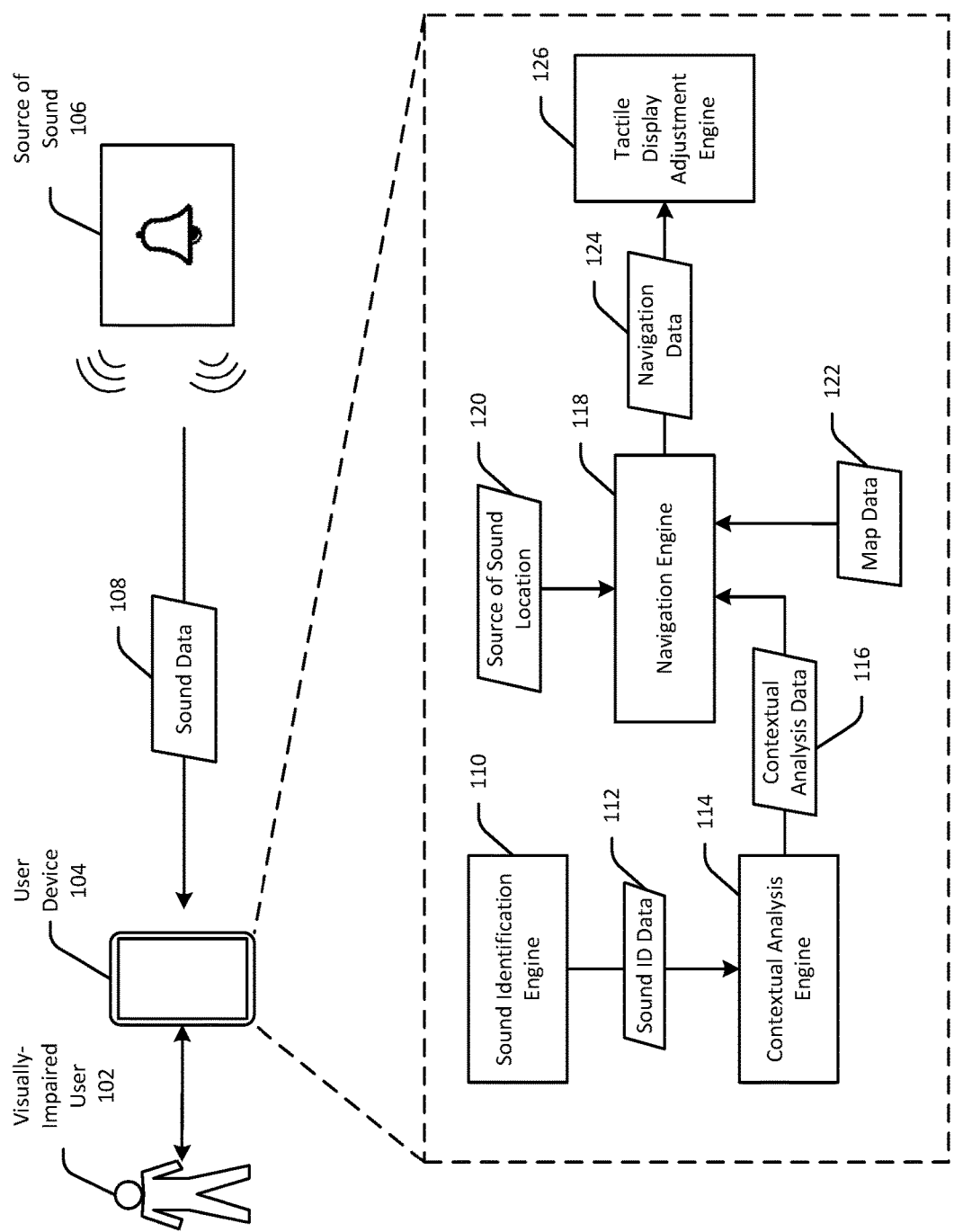
FIG. 1 is a schematic hybrid data flow/block diagram illustrating source-of-sound based navigation in accordance with one or more example embodiments.

Example embodiments relate to, among other things, user devices, methods, computer-readable media, techniques, and methodologies for providing source-of-sound based navigation to a visually-impaired user. A visually-impaired user may find it difficult to navigate in public spaces even with the assistance of a walking stick, a guide dog, or the like. In particular, while such supporting mechanisms may enable a visually-impaired user to avoid obstacles in the user's immediate vicinity, they are not capable of directing the user towards or away from a specific location such as the location of a source of sound in the user's environment.

A sound detected in an environment surrounding a visually-impaired user may be indicative of an occurrence or event to which it is desirable to direct the user. For instance, an individual may call out to a visually-impaired user from a distance, in which case, it may be desirable to direct the visually-impaired user to the individual. As another non-limiting example, a sound detected in the environment may be indicative of crowd noise associated with a gathering or event that the visually-impaired user wishes to attend, in which case, it is desirable to direct the user to the source of the sound.

In other example embodiments, a sound detected in an environment of a visually-impaired user may be indicative of an occurrence or an event that may pose a danger to the user, and thus, should be avoided by the user, in which case, it is desirable to direct the visually-impaired user away from the source of the sound. For instance, a sound detected in the environment may correspond to a vehicular collision, vehicular movement, the screams of individuals, or any other source of sound that may pose a danger to the visually-impaired user. Further, while in certain scenarios a sound may be indicative of danger that the visually-impaired user should be directed away from, in other example scenarios, it may be desirable to direct the visually-impaired user to the same type of sound. For instance, if the source of sound is representative of a vehicular collision that may have resulted in injury and the visually-impaired user is trained to assist with such injury (e.g., the user is a nurse or doctor), it may be desirable to direct the visually-impaired user to the source of the sound.

Example embodiments provide source-of-sound navigation for a visually-impaired user by first detecting a sound in an environment of the visually-impaired user and determining an approximate location of a source of the sound. In example embodiments, the approximate location of the source of the sound is determined based at least in part on sound intensity values calculated by multiple user devices present in the environment. For instance, multiple user devices may each calculate a respective intensity of the sound detected, and optionally, may further calculate a distance to the source of the sound using, for example, the inverse distance law for sound pressure. The user devices may share this data with the visually-impaired user's device, which in turn, may also calculate the intensity of the sound and the distance to the source of the sound. The visually-impaired user's device may then utilize the collection of sound intensity values and distances to the source of the sound calculated by the multiple user devices to determine an approximate location of the source of the sound (i.e., an approximate distance from and directionality of the source of the sound with respect to the visually-impaired user's current location).

Example embodiments for providing source-of-sound based navigation further include determining a sound category of the detected sound and performing contextual analysis of the sound category to determine whether the visually-impaired user should be directed towards or away from the source of the sound. Various additional operations are then undertaken in dependence on the determination as to whether the visually-impaired user should be directed towards or away from the source of the sound. In particular, in example embodiments, if it is determined that the user should be directed away from the source of the sound, then an evacuation path from the visually-impaired user's current location to a location deemed to be a suitably safe distance away from the source of the sound is determined. A tactile representation of the evacuation path is then generated on a display of the visually-impaired user's device to assist the user in navigating away from the source of the sound. In addition, in example embodiments, a tactile representation of a path to avoid from the user's current location to the source of the sound is also generated on the display of the visually-impaired user's device.

In example embodiments, the tactile representation of the path to avoid may include tactile features that are different from tactile features of the tactile representation of the evacuation path to enable the visually-impaired user to distinguish between the two. For instance, in example embodiments, the display of the visually-impaired user's device is integrated with microfluidics components that enable portions of the display to be raised selectively and dynamically with respect to other portions of the display through the application of fluid pressure to selected fluid ports provided under the surface of the display panel.

Thus, in example embodiments, the tactile representation of the evacuation path may be generated by activating fluid ports of the microfluidics panel to generate a contiguous raised portion of the display extending from the representation on the display of the user's current location to a location on the display that corresponds to a physical location that is a suitably safe distance away from the location of the source of the sound. The path to avoid is then distinguished from the evacuation path in example embodiments by selecting activating fluid ports of the microfluidics panel to generate non-contiguous raised portions of the display that are separated by non-raised portions of the display. In this manner, a visually-impaired user can distinguish the contiguous raised portion of the display representative of the evacuation path from the non-contiguous raised portions of the display representative of the path to avoid. It should be appreciated that in example embodiments, the tactile representation of the path to avoid may be a contiguous raised portion of the display and the tactile representation of the evacuation path may be a series of non-contiguous raised portions. It should be further appreciated that any suitable variations for generating the tactile representations of the evacuation path and the path to avoid are within scope of this disclosure as long as the tactile representations include tactile features that enable distinguishing between the two paths.

In other example embodiments, other techniques can be used to generate the tactile representations and to distinguish one tactile representation from another. For example, embedded resistors may be integrated with the display of the visually-impaired user's device and can be selectively activated to generate the tactile representations. In example embodiments, the embedded resistors are selectively activated to generate a contiguous portion of the display representative of the evacuation path that is at a temperature that is higher than a temperature of surrounding portions of the display. Further, in example embodiments, in order to distinguish the path to avoid from the evacuation path, the tactile representation of the path to avoid is formed by selectively activating embedded resistors to generate a tactile representation of the path to avoid that is at a different temperature from the temperature of the tactile representation of the evacuation path as well as from the temperature of surrounding portions of the display.

In certain example embodiments, the tactile representation of the path to avoid may include a non-contiguous temperature profile according to which some portions of the tactile representation have a temperature similar to the temperature of the tactile representation of the evacuation path while other portions have a different temperature (e.g., a temperature corresponding to the surrounding portions of the display that do not include tactile representations). It should be appreciated that numerous variations of the above examples are also within the scope of the disclosure. That is, in example embodiments, embedded resistors can be selectively activated in any manner as long as the temperature profile of the tactile representation of the evacuation path is distinguishable from the temperature profile of the tactile representation of the path to avoid.

In other example embodiments, if it is determined that the user should be directed towards the source of the sound, then a navigation path from the visually-impaired user's current location to the location of the source of the sound is determined. A tactile representation of the navigation path is then generated on a display of the visually-impaired user's device to assist the user in navigating towards the source of the sound. The tactile representation of the navigation path can be generated using a microfluidics system or embedded resistors as described above, for example.

In example embodiments, the aforementioned tactile representations may be generated as overlays on a map application that is launched on the visually-impaired user's device. Further, in example embodiments, a tactile representation of the determined sound category of the sound is also generated on the display of the visually-impaired user's device at a screen location that corresponds to the determined location of the source of the sound. In this manner, the visually-impaired user can determine in a tactile fashion the type of sound that was detected (e.g., vehicular collision, crowd noise, etc.). Further, in example embodiments, a tactile representation of the visually-impaired user's current location is also generated.

Example embodiments provide various technical features, technical effects, and improvements to computer technology. In particular, example embodiments provide the technical effect of improving mobile device-based navigation for a visually-impaired user by providing source-of-sound based navigation to the user. Technical features that enable this technical effect include the detection of a sound in an environment of the visually-impaired user and the identification of a sound category to which the sound belongs. Technical features further include the determination of whether the visually-impaired user should be directed towards or away from the source of the sound based on a contextual analysis of the sound category. Technical features additionally include generating—in example scenarios in which the visually-impaired user should be directed away from the source of the sound—respective tactile representations on a display of the visually-impaired user's device of an evacuation path and a path to avoid that include respective tactile features that are distinguishable from one another. Technical features also alternatively include generating—in example scenarios in which the visually-impaired user should be directed towards the source of the sound—a tactile representation of a navigation path from the visually-impaired user's current location to the location of the source of the sound. Technical features of example embodiments further include constructing an evacuation path or a navigation path so as to avoid potential obstacles that may make it more difficult for the visually-impaired user to navigate.

The aforementioned technical features enable the technical effect of providing source-of-sound based navigation to a visually-impaired user that enables the user to more effectively navigate towards or away from a sound source. This technical effect constitutes an improvement to computer technology, more specifically, an improvement to computer-based navigation technology, particularly with respect to visually-impaired users. While some conventional navigation applications enable voice-based navigation, such applications do not effectively provide a visually-impaired user with a tactile-based representation of the overall path towards or away from a source of sound. Further, such conventional navigation applications do not enable generating evacuation or navigation paths that are constructed to avoid potential obstacles along the way. In addition, such conventional navigation applications are entirely ineffective for users who are both visually-impaired and hearing-impaired. In contrast, source-of-sound based navigation in accordance with example embodiments enables a user who is both visually-impaired and hearing-impaired to safely navigate towards or away from a sound source based on the corresponding tactile representations that are generated.

Various illustrative methods and corresponding data structures associated therewith will now be described. It should be noted that each operation of the method 500 and/or the method 600 may be performed by one or more of the program modules/engines or the like depicted in FIG. 1 or 7, whose operation will be described in more detail hereinafter. These engines may be implemented in any combination of hardware, software, and/or firmware. In certain example embodiments, one or more of these engines may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
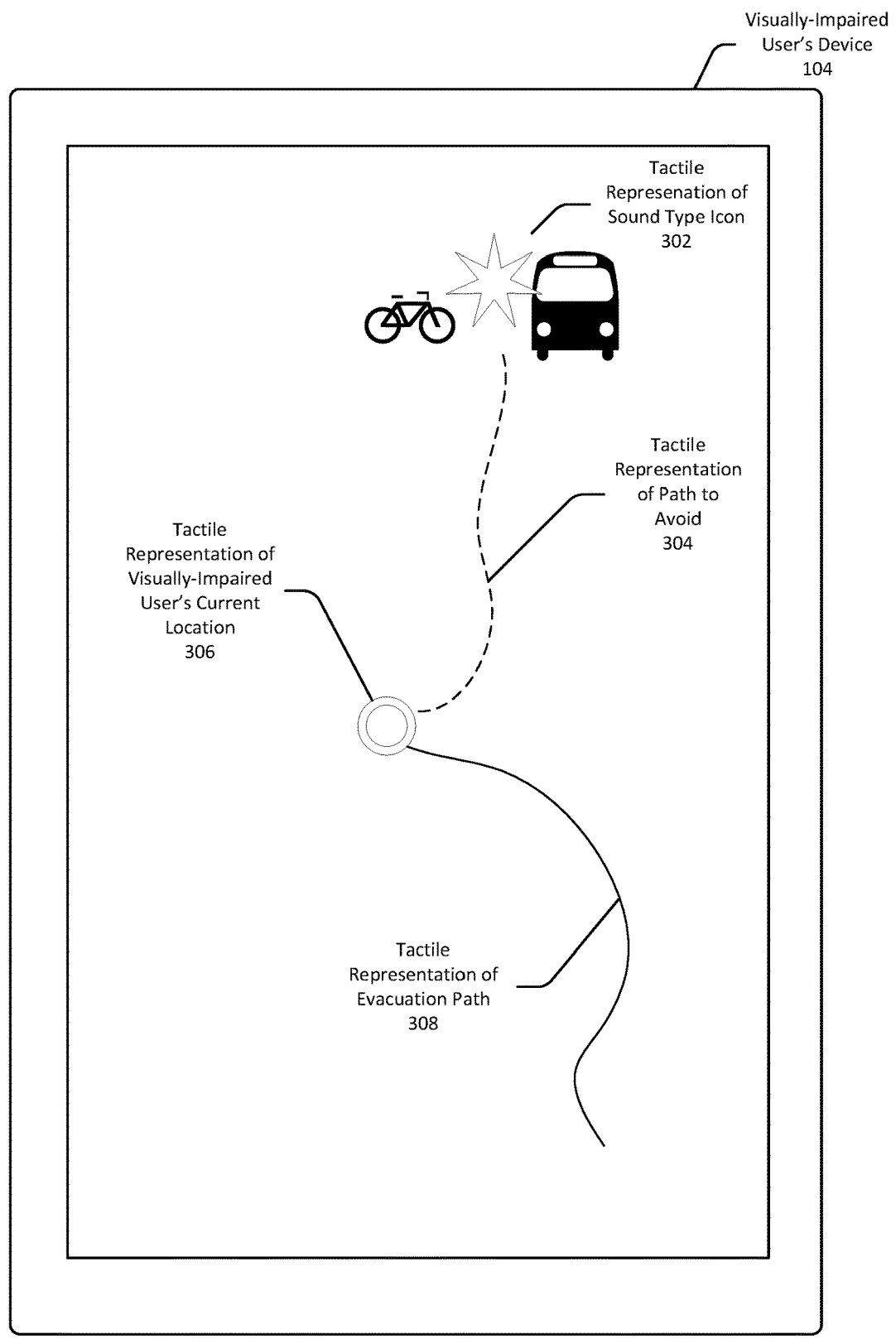
FIG. 3 is a schematic diagram of various tactile representations generated on a display of a visually-impaired user's device including a tactile representation of a sound category of a detected sound, a tactile representation of an evacuation path, and a tactile representation of a path to avoid in accordance with one or more example embodiments.
Figure 6:
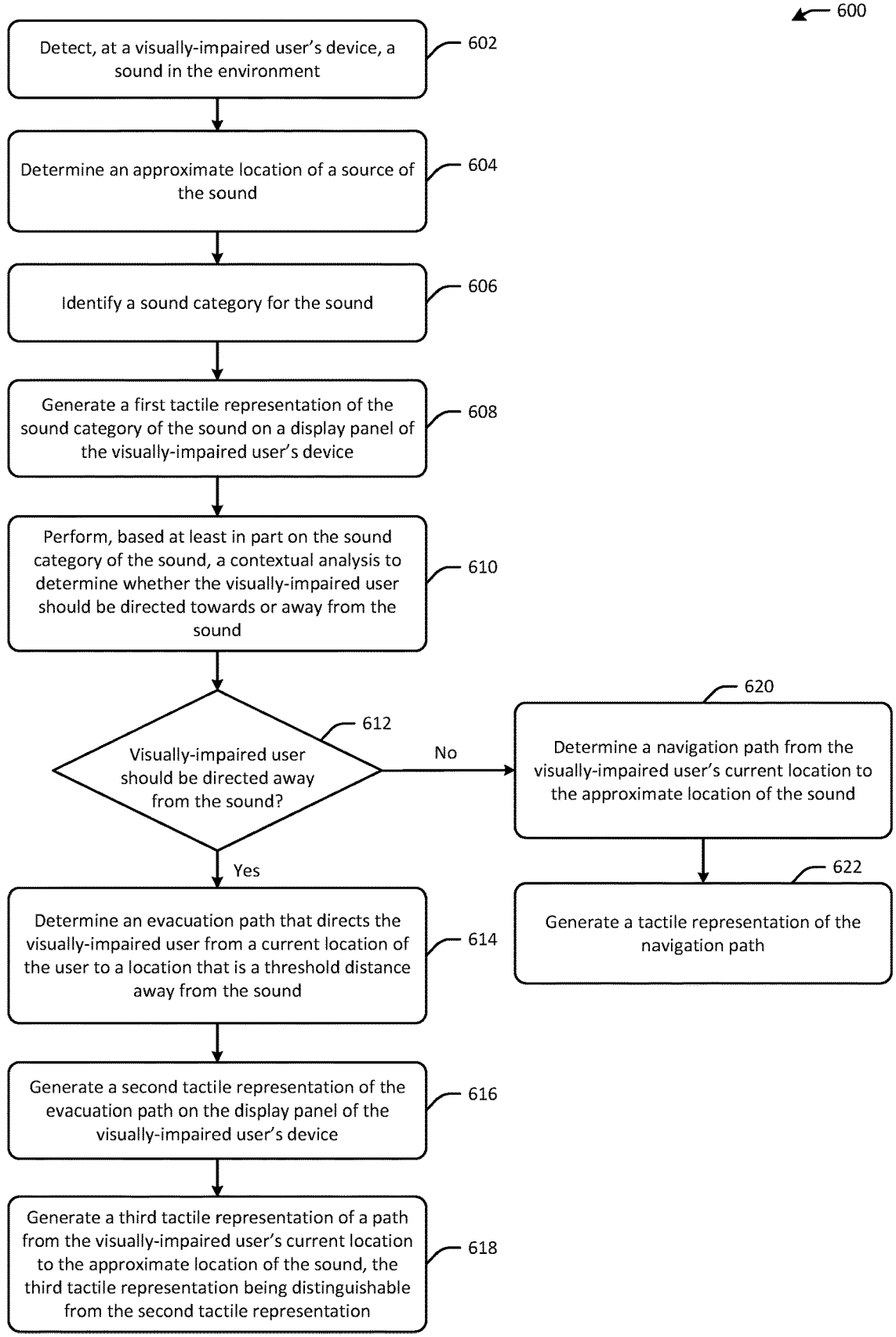
FIG. 6 is a process flow diagram of an illustrative method for providing source-of-sound navigation to a visually-impaired user in accordance with one or more example embodiments.

FIG. 1 is a schematic hybrid data flow/block diagram illustrating source-of-sound based navigation in accordance with one or more example embodiments. FIG. 3 is a schematic diagram of various tactile representations generated on a display of a visually-impaired user's device including a tactile representation of a sound category of a detected sound, a tactile representation of an evacuation path, and a tactile representation of a path to avoid in accordance with one or more example embodiments. FIG. 6 is a process flow diagram of an illustrative method 600 for providing source-of-sound navigation in accordance with one or more example embodiments. FIGS. 1, 3, and 6 will be described in conjunction with one another hereinafter.

Referring first to FIG. 1, a visually-impaired user 102 is depicted as being present within an environment in which a sound is emitted from a sound source 106. The visually-impaired user 102 may utilize a user device 104 configured in accordance with example embodiments to provide sourceof-sound based navigation to the user 102. Referring now to FIG. 6 in conjunction with FIG. 1, at block 602 of the method 600, the sound in the environment is detected at the visually-impaired user's device 104, in example embodiments. In particular, in example embodiments, the user device 104 includes one or more microphones for capturing sound data 108 indicative of a sound emitted from the sound source 106. In other example embodiments, the sound data 108 is captured by another device such as a microphone of another user device or a microphone otherwise provided in the environment and the sound data 108 is then sent to the user device 104. In certain example embodiments, the source-of-sound based navigation disclosed herein is initiated automatically by the visually-impaired user's device 104 upon detection of a sound that has an intensity above a threshold value. In other example embodiments, the visually-impaired user 102 initiates the source-of-sound based navigation after hearing a sound in her environment by making a selection (e.g., pressing a button) on a display of the user device 104.

At block 604 of the method 600, in example embodiments, the user device 104 determines an approximate location 120 of the sound source 106 in relation to a current location of the visually-impaired user 102 (e.g., a current location of the user device 104). In example embodiments, the user device 104 includes a radio receiver configured to receive radio signals from a radio navigation satellite service such as a Global Positioning System (GPS). Assuming that the radio receiver has a line-of-sight to at least a threshold number of satellites (four in the case of GPS), the user device 104 can calculate geo-location information based on the received signals. The geo-location information includes a current location of the user device 104.

Figure 2:
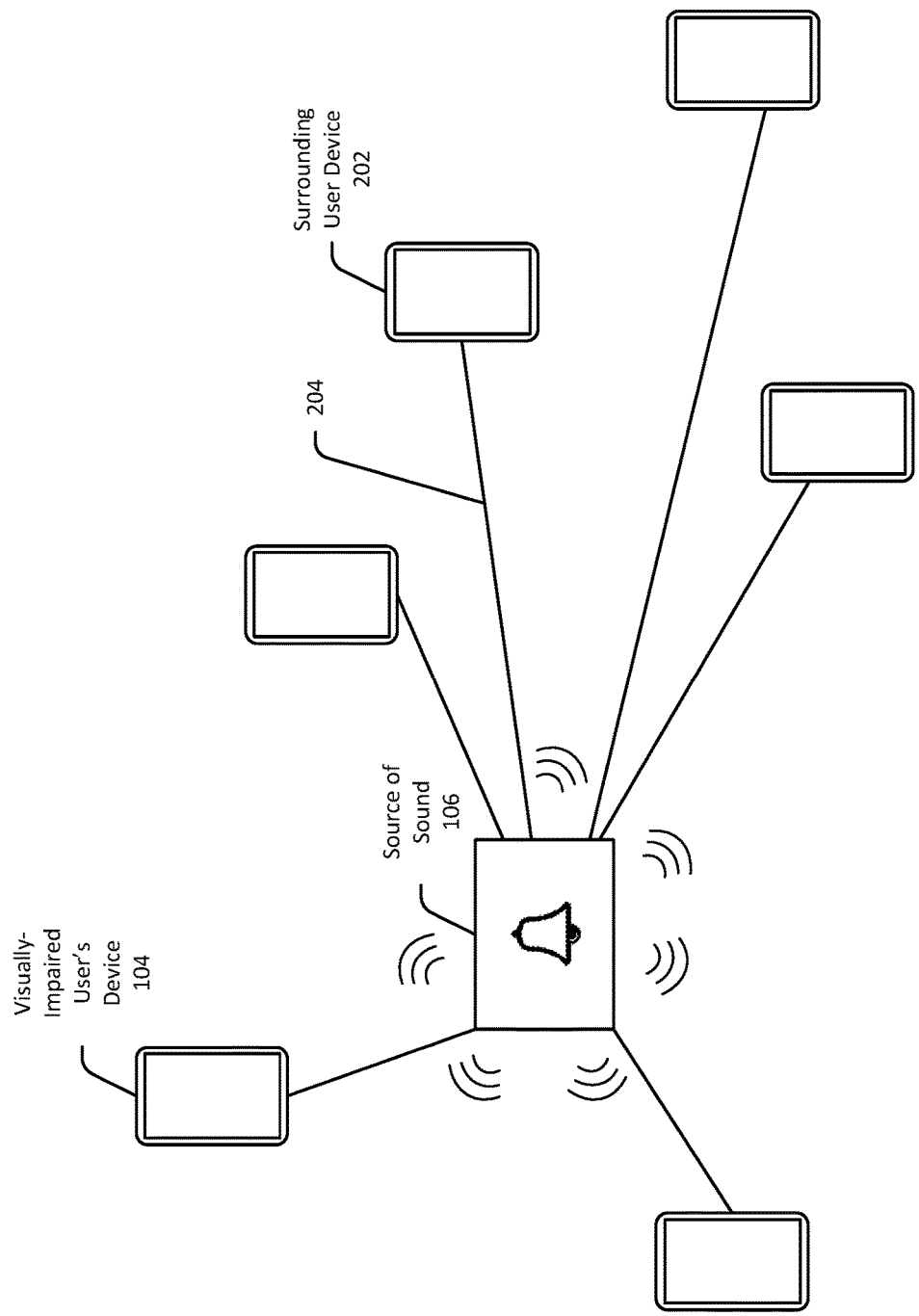
FIG. 2 is a schematic diagram illustrating calculation of sound intensity values by multiple user devices in an environment surrounding a source of sound in accordance with one or more example embodiments.
Figure 5:
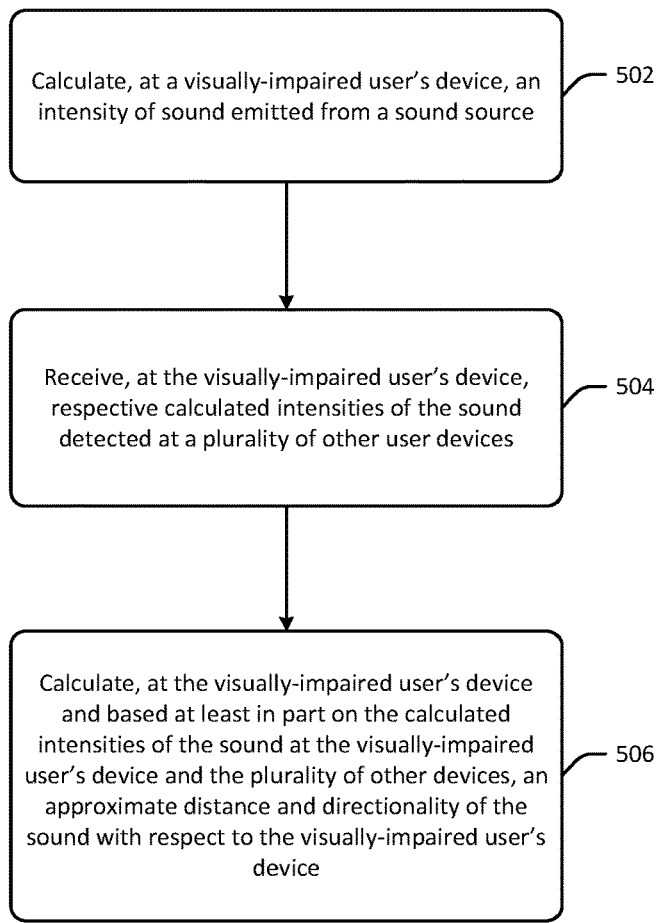
FIG. 5 is a process flow diagram of an illustrative method for determining an approximate location of a source of a sound in an environment based at least in part on sound intensity values calculated by multiple user devices in the environment in accordance with one or more example embodiments.

FIG. 5 is a process flow diagram of an illustrative method 500 for determining the approximate location 120 of the sound source 106 based at least in part on sound intensity values calculated by multiple user devices in the environment surrounding the sound source 106 in accordance with one or more example embodiments. FIG. 2 is a schematic diagram illustrating calculation of sound intensity values by multiple user devices in the environment surrounding the sound source 106 in accordance with one or more example embodiments. FIGS. 2 and 5 will be described in conjunction with one another hereinafter.

At block 502 of the method 500, in example embodiments, the user device 104 calculates an intensity of the sound emitted from the sound source 106. In particular, in example embodiments, the user device 104 calculates a sound intensity value such as a decibel level or a sound pressure of the sound detected at the user device 104. In example embodiments, the user device 102 then optionally utilizes a correlation such as an inverse distance law for sound pressure to calculate an approximate distance between the user device 104 and the sound source 106. In certain example embodiments, the user device 104 may include or otherwise be integrated with multiple sound capturing devices (e.g., multiple microphones) such that multiple sound intensity values can be calculated with respect to the detected sound arriving from different directions. In this manner, the calculation of the distance to and directionality of the sound source 106 with respect to the user device 104 can be improved.

Then, at block 504 of the method 500, the user device 104 receives respective sound intensity values calculated at multiple other user devices 202 in the environment surrounding the sound source 106. In particular, in example embodiments, any given user device 202 in the environment surrounding the sound source 106 detects the sound and calculates a respective sound intensity value (e.g., a decibel level, a sound pressure value, etc.) corresponding to the detected sound. Optionally, in example embodiments, a user device 202 also calculates an approximate distance 204 from the user device 202 to the sound source 106 using a distance and sound intensity correlation, as described above. The user device 202 may share this distance calculation with the visually-impaired user's device 104 as well. In addition, in example embodiments, a user device 202 share its geo-location data with the visually-impaired user's device 104.

At block 506 of the method 500, in example embodiments, the user device 104 determines the approximate location 120 of the sound source 106 by calculating an approximate distance to and directionality of the sound source 106 with respect to the user device 104 based at least in part on the sound intensity value calculated at the user device 104 as well as the sound intensity values received from the other user devices 202 in the surrounding environment. Further, in certain example embodiments, the visually-impaired user's device 104 also determines the approximate location 120 of the sound source 106 based at least in part on distance calculations and/or geo-location information received from the user devices 202. In this manner, the approximate location of the sound source 106 can be determined through collaborative data sharing between the user device 104 and the other user devices 202 in the surrounding environment. Further, as previously noted, the use of multiple microphones integrated with the user device 104 and/or distributed across multiple user devices 202 improves the accuracy of the calculation of the approximate distance to and directionality of the sound source 106 with respect to the user device 104. In other example embodiments, geo-location data indicative of the location 120 of the sound source 106 is shared by the sound source 106 or a device associated therewith. For instance, if the sound is a public announcement, then geo-location information can be shared along with the sound data 108 indicative of the public announcement.

Referring again to FIG. 6, at block 606 of the method 600, the user device 104 identifies a sound category to which the sound emitted from the sound source 106 belongs in accordance with example embodiments. More specifically, the user device 104 includes, in example embodiments, a sound identification engine 110 configured to receive the sound data 108 indicative of the sound and determine a sound category for the sound. In example embodiments, the sound identification engine 110 compares a sound profile of the detected sound to stored sound profiles that have been previously classified into various sound types or categories. The stored sound profiles may include, for example, sounds categorized as vehicular accidents/collisions; sounds categorized as human speech or noise (e.g., crowd noise, screams from individuals, etc.); sounds categorized as heavy machinery sounds (e.g., sounds emitted from a construction site); and so forth.

The sound identification engine 110 can utilize any suitable sound pattern comparison algorithm to identify a stored sound profile that most closely matches the detected sound. The sound identification engine 110 then classifies the detected sound in the same sound category as the closest matching sound profile. In example embodiments, the sound identification engine 110 then provides an indication of the determined sound category to a contextual analysis engine 114 in the form of sound ID data 112.

At block 608 of the method 600, in example embodiments, the user device 104 generates, on a display panel of the user device 104, a tactile representation of the sound category determined for the detected sound. For example, as shown in FIG. 3, a tactile representation 302 of an icon that is indicative of the sound category of the detected sound can be formed on a display panel of the visually-impaired user's device 104. In example embodiments, the sound identification engine 110 sends the sound ID data 112 to a tactile display adjustment engine 126 that is configured to communicate with a tactile display adjustment system to cause the tactile representation 302 to be generated. In example embodiments, the tactile display adjustment system is a microfluidics system integrated with the display panel of the user device 104, as depicted in FIG. 4.

Figure 4:
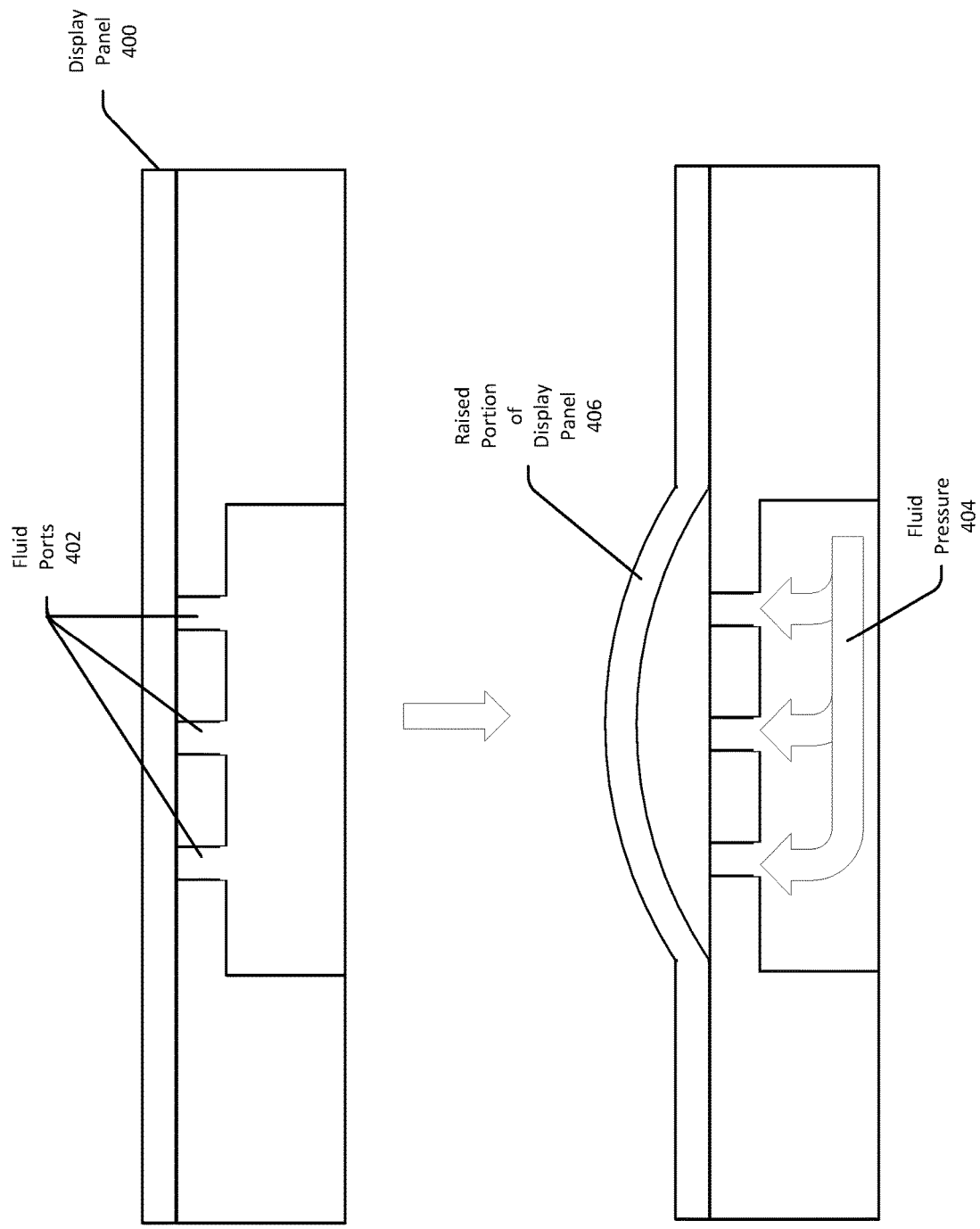
FIG. 4 is a schematic diagram of a microfluidics system integrated with a display panel of a user device and its operation in accordance with one or more example embodiments.

Referring to FIG. 4 in conjunction with FIG. 1, in example embodiments, the tactile display adjustment engine 126 causes a selected number and arrangement of fluid ports 402 to be activated such that fluid pressure 404 is applied to the selected ports to cause one or more portions 406 of the display panel 400 of the user device 104 disposed in opposition to the activated fluid ports 402 to become raised in relation to other portions of the display panel 400. In this manner, the tactile representation 302 may be generated and may include one or more raised portions 406 of the display panel that are identifiable by the visually-impaired user 102 as being representative of a particular type of sound (the determined sound category).

Referring again to FIG. 6, at block 610 of the method 600, the contextual analysis engine 114 executing on the visually-impaired user's device 104 performs, in example embodiments, a contextual analysis based at least in part on the sound ID data 112, or more specifically, based at least in part on the determined sound category of the detected sound. The contextual analysis engine 114 then provides the results of the contextual analysis to a navigation engine 118 in the form of contextual analysis data 116. In example embodiments, the contextual analysis data 116 indicates whether the visually-impaired user 102 should be directed towards or away from the detected sound.

As previously described, the visually-impaired user 102 may generally be directed away from a sound that has been categorized into a sound category that indicates that the source of the sound 106 may pose a danger to the user 102 (e.g., a vehicular collision, an explosion, vehicular movement, screams of individuals, etc.). Further, the user 102 may generally be directed towards a sound that has been categorized into a sound category that does not typically pose a danger to the user 102 (e.g., a known contact calling out to the user 102). However, in certain example embodiments, although a sound is categorized into a sound category that is typically deemed to pose a danger, the user 102 may nonetheless be directed towards the source 106 of the sound. Further, in certain other example embodiments, although a sound is categorized into a sound category that is typically deemed not to pose a danger, the user 102 may nonetheless be directed away from the source 106 of the sound.

For instance, in example embodiments, the contextual analysis engine 114 accesses other data to determine whether the visually-impaired user 102 should be directed towards or away from the location 120 of the sound source 106. As a non-limiting example, if the sound is categorized as a vehicular collision, the contextual analysis engine 114 may access social media data of the visually-impaired user 102 and motor vehicle registration data of vehicles involved in the collision to determine that one or more social contacts (e.g., friends, family, etc.) may be involved in the collision. In such an example scenario, the visually-impaired user 102 may be directed towards the location 120 of the sound source 106, or alternatively, may be informed of the potential involvement of social media contacts of the user 102 in the collision and given the option of being directed towards the location 120 of the sound source 106.

As another non-limiting example, assuming again that the sound is categorized as a vehicular collision, the contextual analysis engine 114 may access user profile data associated with the visually-impaired user 102 to determine that the user 102 is trained to assist with medical emergencies (e.g., the user 102 is a nurse or doctor). In such an example scenario, the visually-impaired user 102 may be directed towards the location 120 of the sound source 106, or alternatively, may be informed of the potential of injury associated with the collision and given the option of being directed towards the location 120 of the sound source 106.

As yet another non-limiting example, the detected sound may be categorized as screams of individuals. The contextual analysis engine 114 may determine that the detected sound corresponds to crowd noise associated with an event or other gathering based, for example, on external data such as an event data feed or image data of the location 120 of the sound source 106. In example embodiments, the contextual analysis engine 114 accesses calendar data or email data associated with the visually-impaired user 102 to determine that the user has expressed an interest in attending an event. The contextual analysis engine 114 further determines that a physical address of the event coincides with the location 120 of the sound source 106. In such an example scenario, the contextual analysis data 116 generated by the contextual analysis engine 114 may indicate that the user 102 is to be directed towards the location 120 of the sound source 106.

In other example embodiments, the contextual analysis engine 114 may determine that the visually-impaired user 102 should be directed away from a sound that has been categorized into a typically innocuous sound category such as an individual calling out to the user 102. The contextual analysis engine 114 may perform natural language processing of the sound data 108 corresponding to the individual calling out to the user 102 to determine that the individual poses a potential threat to the visually-impaired user, in which case, the contextual analysis data 116 generated by the contextual analysis engine 114 may indicate that the user 102 should be directed away from the location 120 of the sound source 106. It should be appreciated that the above examples of scenarios in which the contextual analysis engine 114 determines that the user 102 should be directed towards or away from the location 120 of the sound source 106 are merely illustrative and not exhaustive and that numerous other scenarios are within the scope of this disclosure.

Referring again to FIG. 6, in example embodiments, if the contextual analysis data 116 indicates that the visually-impaired user 102 should be directed away from the location 120 of the sound source 106, then a positive determination is made at block 612 of the method 600, and the method 600 proceeds to block 614. At block 614 of the method 600, in example embodiments, the navigation engine 118 determines an evacuation path that directs the visually-impaired user 102 away from the location 120 of the sound source 106. More particularly, in example embodiments, the evacuation path directs the user 102 from a current location of the user 102 to a location that is a threshold distance away from the location 120 of the sound source 106. In example embodiments, the navigation engine 118 receives as inputs the location 120 of the source 106 of the sound and map data 122 in addition to the contextual analysis data 116. Based on these received inputs, the navigation engine 118 identifies an evacuation path that safely directs the user away from the location 120 of the source 106 of the sound, and thus, away from the potential danger posed by the sound. In example embodiments, the navigation engine 118 constructs the evacuation path so as to avoid potential obstacles or impediments that may make it more difficult for the visually-impaired user 102 to navigate. For example, the navigation engine 118 may determine from the map data 122 that a particular portion of a sidewalk is closed off due to construction and may construct the evacuation path such that it navigates the user 102 around the construction zone. At block 616 of the method 600, the navigation engine 118 may provide navigation data 124 indicative of the determined evacuation path to the tactile display adjustment engine 126 which may, in turn, instruct a tactile display adjustment system to generate a tactile representation of the evacuation path on the display panel of the visually-impaired user's device 104.

In certain example embodiments, the navigation engine 118 may also determine a path to avoid between the visually-impaired user's current location and the location 120 of the sound source 106. The navigation engine 118 may determine the path to avoid as part of the operation at block 614 or as part of a distinct operation of the method 600. In such example embodiments, the navigation data 124 provided as input to the tactile display adjustment engine 126 may also include an indication of the path to avoid, and at block 618 of the method 600, the tactile display adjustment engine 126 may instruct the tactile display adjustment system to generate a tactile representation of the path to avoid. The tactile representation of the evacuation path and the tactile representation of the path to avoid may include respective tactile features that allow the visually-impaired user 102 to distinguish between the two paths.

FIG. 3 depicts an example tactile representation 304 of the path to avoid and an example tactile representation 308 of the evacuation path. In addition, in example embodiments, the method 600 includes generating a tactile representation 306 of the visually-impaired user's current location. Referring to FIG. 4, in those example embodiments in which the display 400 of the visually-impaired user's device 104 is integrated with microfluidics components, the tactile representation 308 of the evacuation path may be generated by selectively activating fluid ports 402 of the microfluidics panel to generate a contiguous raised portion 406 of the display 400 extending from the tactile representation 306 of the visually-impaired user's current location to the tactile representation 302 of the sound source 106. The path to avoid is then distinguished from the evacuation path in example embodiments by selecting activating other fluid ports of the microfluidics panel to generate non-contiguous raised portions of the display 400 that are separated by non-raised portions of the display 400. In this manner, the visually-impaired user 102 can distinguish the contiguous raised portion 406 of the display 400 representative of the evacuation path from the non-contiguous raised portions of the display 400 representative of the path to avoid. The visually-impaired user 102 may be provided with an indication that the contiguous raised portion represents the evacuation path and that the non-contiguous raised portions represent the path to avoid. For example, the visually-impaired user may be audibly informed of this correspondence, or alternatively, a legend may be generated on the display 400 to inform the user 102 of the correspondence. Further, in example embodiments, such a legend may also include a tactile scale that provides an indication of a correspondence between a distance traversed on the screen (e.g., a distance of a drag operation along a tactile representation) and a physical world distance.

In other example embodiments, other techniques can be used to generate the tactile representations 304, 308 and to distinguish the one tactile representation from the other. For example, embedded resistors may be integrated with the display 400 of the visually-impaired user's device 104 and can be selectively activated to generate the tactile representations 304, 308. In example embodiments, the embedded resistors are selectively activated to cause the tactile representation 308 of the evacuation path to be at a higher temperature than surrounding portions of the display 400. Further, in example embodiments, in order to distinguish the path to avoid from the evacuation path, the tactile representation 304 of the path to avoid is formed by selectively activating embedded resistors to cause the tactile representation 304 to be at a different temperature from the temperature of the tactile representation 308 of the evacuation path as well as from the temperature of surrounding portions of the display 400. In other example embodiments, the tactile representation 304 of the path to avoid may include a non-contiguous temperature profile according to which some portions of the tactile representation 304 have a temperature similar to the temperature of the tactile representation 308 of the evacuation path while other portions have a different temperature (e.g., a temperature corresponding to the surrounding portions of the display 400 that do not include tactile representations).

Referring again to FIG. 6, in those example embodiments in which the contextual analysis data 116 contains an indication that the visually-impaired user 102 should be directed towards the location 120 of the sound source 106, a negative determination is made at block 612, and the method 600 proceeds to block 620, where the navigation engine 118 determines a navigation path from the visually-impaired user's current location to the location 120 of the sound source 106. As previously described with respect to the evacuation path, the navigation path may be constructed so as to avoid any potential obstacles to the visually-impaired user's ability to navigate successfully. The navigation engine 118 may provide the tactile display adjustment engine 126 with navigation data 124 indicative of the navigation path, and at block 622 of the method 600, the tactile display adjustment engine 126 may instruct the tactile display adjustment system to generate a tactile representation of the navigation path on a display of the visually-impaired user's device 104. While FIG. 3 does not depict the tactile representation of the navigation path, it should be appreciated that similar mechanisms as described previously (e.g., microfluidics components, embedded resistors, or the like) may be used to generate the tactile representation of the navigation path. The tactile representation of the navigation path may extend from the tactile representation 306 of the current location of the visually-impaired user 102 to the tactile representation 302 of the sound type.

In example embodiments, the navigation engine 118 may dynamically update the evacuation path or the navigation path based on updated map data 122 that it may receive. For instance, if updated map data 122 is received that indicates that a particular sidewalk has been closed or that a potential danger or impediment that did not previously exist is now present along a determined path, the navigation engine 118 may dynamically adjust the path to navigate around the closure or avoid the potential danger. In example embodiments, as a path (e.g., an evacuation path or a navigation path) is dynamically changed, the corresponding tactile representation may also be dynamically altered to reflect the change.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 7:
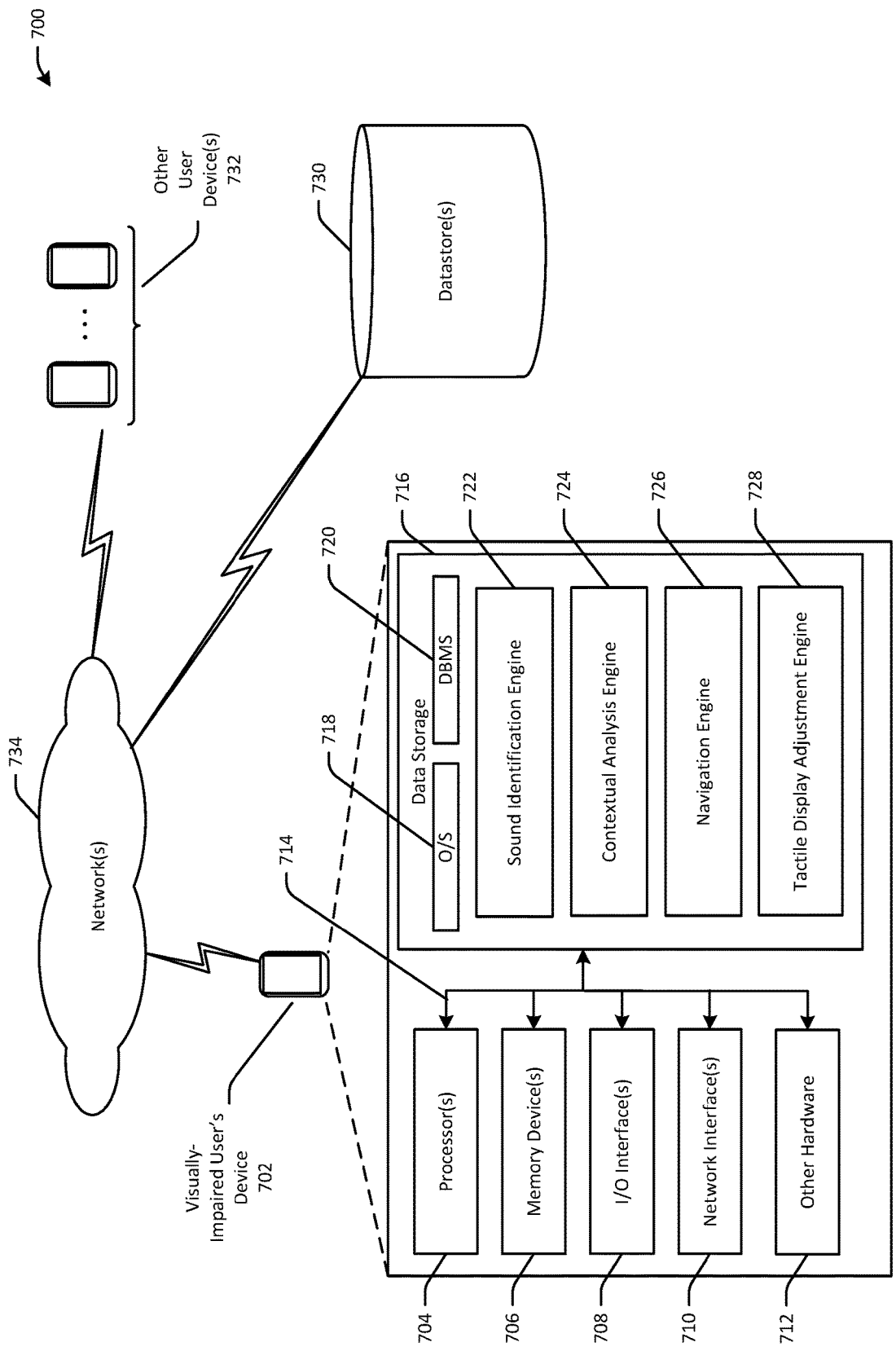
FIG. 7 is a schematic diagram of an illustrative networked architecture configured to implement one or more example embodiments.

FIG. 7 is a schematic diagram of an illustrative networked architecture 700 configured to implement one or more example embodiments of the disclosure. The networked architecture 700 may include a visually-impaired user's device 702 and one or more other user devices 732. In example embodiments, the visually-impaired user's device 702 may correspond to the visually-impaired user's device 104 and the other user devices 732 may correspond to the user devices 202. While any particular component of the networked architecture 700 may be described herein in the singular, it should be appreciated that multiple instances of any such component may be provided, and functionality described in connection with a particular component may be distributed across multiple ones of such a component.

In example embodiments, the visually-impaired user's device 702 and the other user devices 732 may be configured to communicate via one or more network(s) 734. Further, in certain example embodiments, the visually-impaired user's device 702 may communicate with one or more servers via the network(s) 734. In certain example embodiments, the server(s) may perform all or some of the source-of-sound based navigation processing described herein as being performed on the visually-impaired user's device 702. The network(s) 734 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 734 may have any suitable communication range associated therewith and may include, for example, global networks (e.g., the Internet), metropolitan area networks (MANs), wide area networks (WANs), local area networks (LANs), or personal area networks (PANs). In addition, the network(s) 734 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the visually-impaired user's device 702 may include one or more processors (processor(s)) 704, one or more memory devices 706 (generically referred to herein as memory 706), one or more input/output ("I/O") interface(s) 708, one or more network interfaces 710, and data storage 716. The visually-impaired user's device 702 may further include one or more buses 714 that functionally couple various components of the visually-impaired user's device 702. In addition, the visually-impaired user's device 702 may include other hardware 712 including a tactile display adjustment system such as, for example, a microfluidics system, a system of embedded resistors, or the like.

The bus(es) 714 may include at least one of a system bus, a memory bus, an address bus, or a message bus, and may permit the exchange of information (e.g., data (including computer-executable code), signaling, etc.) between various components of the Visually-impaired user's device 702. The bus(es) 714 may include, without limitation, a memory bus or a memory controller, a peripheral bus, an accelerated graphics port, and so forth. The bus(es) 714 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 706 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 706 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 706 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 716 may include removable storage and/or non-removable storage including, but not limited to, magnetic storage, optical disk storage, and/or tape storage. The data storage 716 may provide non-volatile storage of computer-executable instructions and other data. The memory 706 and the data storage 716, removable and/or non-removable, are examples of computer-readable storage media (CRSM) as that term is used herein.

The data storage 716 may store computer-executable code, instructions, or the like that may be loadable into the memory 706 and executable by the processor(s) 704 to cause the processor(s) 704 to perform or initiate various operations. The data storage 716 may additionally store data that may be copied to memory 706 for use by the processor(s) 704 during the execution of the computer-executable instructions. Moreover, output data generated as a result of execution of the computer-executable instructions by the processor(s) 704 may be stored initially in memory 706 and may ultimately be copied to data storage 716 for non-volatile storage.

More specifically, the data storage 716 may store one or more operating systems (O/S) 718; one or more database management systems (DBMS) 720 configured to access the memory 706 and/or one or more external datastores 730; and one or more program modules, applications, engines, managers, computer-executable code, scripts, or the like such as, for example, a sound identification engine 722, a contextual analysis engine 724, a navigation engine 726, and a tactile display adjustment engine 728. Any of the components depicted as being stored in data storage 716 may include any combination of software, firmware, and/or hardware. The software and/or firmware may include computer-executable instructions (e.g., computer-executable program code) that may be loaded into the memory 706 for execution by one or more of the processor(s) 704 to perform any of the operations described earlier in connection with correspondingly named modules/services.

Although not depicted in FIG. 7, the data storage 716 may further store various types of data utilized by components of the visually-impaired user's device 702 (e.g., data stored in the datastore(s) 730). Any data stored in the data storage 716 may be loaded into the memory 706 for use by the processor(s) 704 in executing computer-executable instructions. In addition, any data stored in the data storage 716 may potentially be stored in the external datastore(s) 730 and may be accessed via the DBMS 720 and loaded in the memory 706 for use by the processor(s) 704 in executing computer-executable instructions.

The processor(s) 704 may be configured to access the memory 706 and execute computer-executable instructions loaded therein. For example, the processor(s) 704 may be configured to execute computer-executable instructions of the various program modules, applications, engines, managers, or the like of the visually-impaired user's device 702 to cause or facilitate various operations to be performed in accordance with one or more embodiments of the disclosure. The processor(s) 704 may include any suitable processing unit capable of accepting data as input, processing the input data in accordance with stored computer-executable instructions, and generating output data. The processor(s) 704 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 704 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 704 may be capable of supporting any of a variety of instruction sets.

Referring now to other illustrative components depicted as being stored in the data storage 716, the O/S 718 may be loaded from the data storage 716 into the memory 706 and may provide an interface between other application software executing on the visually-impaired user's device 702 and hardware resources of the visually-impaired user's device 702. More specifically, the O/S 718 may include a set of computer-executable instructions for managing hardware resources of the visually-impaired user's device 702 and for providing common services to other application programs. In certain example embodiments, the O/S 718 may include or otherwise control the execution of one or more of the program modules, engines, managers, or the like depicted as being stored in the data storage 716. The O/S 718 may include any operating system now known or which may be developed in the future including, but not limited to, any server operating system, any mainframe operating system, or any other proprietary or non-proprietary operating system.

The DBMS 720 may be loaded into the memory 706 and may support functionality for accessing, retrieving, storing, and/or manipulating data stored in the memory 706, data stored in the data storage 716, and/or data stored in external datastore(s) 730. The DBMS 720 may use any of a variety of database models (e.g., relational model, object model, etc.) and may support any of a variety of query languages. The DBMS 720 may access data represented in one or more data schemas and stored in any suitable data repository. Data stored in the datastore(s) 730 may include, for example, the map data 122 or any of the other types of external data previously described. Further, in certain example embodiments, the datastore(s) 730 may also store data generated on the user device 702 such as, for example, the sound ID data 112, the contextual analysis data 116, the navigation data 124, and so forth. Datastore(s) 730 that may be accessible by the visually-impaired user's device 702 via the DBMS 720 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the visually-impaired user's device 702, the input/output (I/O) interface(s) 708 may facilitate the receipt of input information by the visually-impaired user's device 702 from one or more I/O devices as well as the output of information from the visually-impaired user's device 702 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the visually-impaired user's device 702 or may be separate. The I/O devices may further include, for example, any number of peripheral devices such as data storage devices, printing devices, and so forth.

The I/O interface(s) 708 may also include an interface for an external peripheral device connection such as universal serial bus (USB), FireWire, Thunderbolt, Ethernet port or other connection protocol that may connect to one or more networks. The I/O interface(s) 708 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The visually-impaired user's device 702 may further include one or more network interfaces 710 via which the visually-impaired user's device 702 may communicate with any of a variety of other systems, platforms, networks, devices, and so forth. The network interface(s) 710 may enable communication, for example, with one or more other devices via one or more of the network(s) 734.

It should be appreciated that the engines depicted in FIG. 7 as being stored in the data storage 716 are merely illustrative and not exhaustive and that processing described as being supported by any particular engine may alternatively be distributed across multiple modules, engines, or the like, or performed by a different module, engine, or the like.

In addition, various program module(s), script(s), plug-in(s), Application Programming Interface(s) (API(s)), or any other suitable computer-executable code hosted locally on the visually-impaired user's device 702 and/or other computing devices accessible via one or more of the networks 734, may be provided to support functionality provided by the engines depicted in FIG. 7 and/or additional or alternate functionality. Further, functionality may be modularized in any suitable manner such that processing described as being performed by a particular engine may be performed by a collection of any number of engines or program modules, or functionality described as being supported by any particular engine may be supported, at least in part, by another engine. In addition, engines that support the functionality described herein may be executable across any number of cluster members in accordance with any suitable computing model such as, for example, a client-server model, a peer-to-peer model, and so forth. In addition, any of the functionality described as being supported by any of the engines depicted in FIG. 7 may be implemented, at least partially, in hardware and/or firmware across any number of devices.

It should further be appreciated that the visually-impaired user's device 702 may include alternate and/or additional hardware, software, or firmware components beyond those described or depicted without departing from the scope of the disclosure. More particularly, it should be appreciated that software, firmware, or hardware components depicted as forming part of the visually-impaired user's device 702 are merely illustrative and that some components may not be present or additional components may be provided in various embodiments. While various illustrative engines have been depicted and described as software modules stored in data storage 716, it should be appreciated that functionality described as being supported by the engines may be enabled by any combination of hardware, software, and/or firmware. It should further be appreciated that each of the above-mentioned engines may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine may, in various embodiments, be provided at least in part by one or more other engines. Further, one or more depicted engines may not be present in certain embodiments, while in other embodiments, additional program modules and/or engines not depicted may be present and may support at least a portion of the described functionality and/or additional functionality.

One or more operations of the method 500 or the method 600 may be performed by a visually-impaired user's device 702 having the illustrative configuration depicted in FIG. 7, or more specifically, by one or more program modules, engines, applications, or the like executable on such a device, potentially working in conjunction with the other user devices 732 and/or one or more remotely located servers. It should be appreciated, however, that such operations may be implemented in connection with numerous other device and/or architectural configurations.

The operations described and depicted in the illustrative methods of FIGS. 5 and 6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 5 and 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing source-of-sound based navigation, the method comprising:
    detecting, at a user device, a sound in an environment;
    determining a location of a source of the sound;
    identifying a sound category of the sound;
    performing, based at least in part on the sound category, a contextual analysis of the sound;
    determining, based at least in part on the contextual analysis of the sound, that a visually-impaired user of the user device should be directed away from the location of the source of the sound;
    determining an evacuation path for directing the visually-impaired user away from the source of the sound; and
    generating, on a display of the user device, a tactile representation of the evacuation path.

2. The computer-implemented method of claim 1, further comprising:
    generating, on the display of the user device, a tactile representation of a path to avoid from a current location of the user device to the location of the source of the sound,
    wherein the tactile representation of the path to avoid indicates to the visually-impaired user that the path should be avoided, and
    wherein the tactile representation of the path to avoid is distinguishable by touch of the visually-impaired user from the tactile representation of the evacuation path.

3. The computer-implemented method of claim 2, wherein at least one of:
    i) the tactile representation of the evacuation path comprises a contiguous raised portion of the display of the user device and the tactile representation of the path to avoid comprises a first set of raised portions of the display of the user device and a second set of non-raised portions of the display of the user device, or
    ii) the tactile representation of the evacuation path comprises a contiguous portion of the display of the user device having a first temperature that is distinguishable by the visually-impaired user from a second temperature of other portions of the display of the user device and the tactile representation of the path to avoid comprises one or more portions of the display of the user device having a third temperature that is different from the first temperature.

4. The computer-implemented method of claim 1, further comprising:
    generating, on the display of the user device, a tactile representation of the sound category.

5. The computer-implemented method of claim 1, wherein determining the evacuation path comprises:
- accessing map data to identify one or more obstacles; and
- constructing the evacuation path so as to avoid the one or more obstacles.

6. The computer-implemented method of claim 1, wherein determining the location of the source of the sound comprises:
- calculating, at the user device, a first sound intensity value of the sound detected at the user device;
- receiving, at the user device, additional sound intensity values calculated by a plurality of other user devices in the environment that detect the sound; and
- calculating, at the user device, the location of the source of the sound based at least in part on the first sound intensity value and the additional sound intensity values.

7. The computer-implemented method of claim 1, further comprising:
- receiving sound data indicative of the sound;
- receiving metadata associated with the sound data, wherein the metadata comprises location information indicative of the location of the source of the sound.

8. A user device for providing source-of-sound based navigation, comprising:
- at least one memory storing computer-executable instructions; and
- at least one processor, wherein the at least one processor is configured to access the at least one memory and execute the computer-executable instructions to:
  - detect, at the user device, a sound in an environment;
  - determine a location of a source of the sound;
  - identify a sound category of the sound;
  - perform, based at least in part on the sound category, a contextual analysis of the sound;
  - determine, based at least in part on the contextual analysis of the sound, that a visually-impaired user of the user device should be directed away from the location of the source of the sound;
  - determine an evacuation path for directing the visually-impaired user away from the source of the sound; and
  - generate, on a display of the user device, a tactile representation of the evacuation path.

9. The user device of claim 8, wherein the at least one processor is further configured to execute the computer-executable instructions to:
- generate, on the display of the user device, a tactile representation of a path to avoid from a current location of the user device to the location of the source of the sound,
- wherein the tactile representation of the path to avoid indicates to the visually-impaired user that the path should be avoided, and
- wherein the tactile representation of the path to avoid is distinguishable by touch of the visually-impaired user from the tactile representation of the evacuation path.

10. The user device of claim 9, wherein at least one of:
i) the tactile representation of the evacuation path comprises a contiguous raised portion of the display of the user device and the tactile representation of the path to avoid comprises a first set of raised portions of the display of the user device and a second set of non-raised portions of the display of the user device, or
ii) the tactile representation of the evacuation path comprises a contiguous portion of the display of the user device having a first temperature that is distinguishable by the visually-impaired user from a second temperature of other portions of the display of the user device and the tactile representation of the path to avoid comprises one or more portions of the display of the user device having a third temperature that is different from the first temperature.

11. The user device of claim 8, wherein the at least one processor is further configured to execute the computer-executable instructions to:
- generate, on the display of the user device, a tactile representation of the sound category.

12. The user device of claim 8, wherein the at least one processor is configured to determine the evacuation path by executing the computer-executable instructions to:
- access map data to identify one or more obstacles; and
- construct the evacuation path so as to avoid the one or more obstacles.

13. The user device of claim 8, wherein the at least one processor is configured to determine the location of the source of the sound by executing the computer-executable instructions to:
- calculate, at the user device, a first sound intensity value of the sound detected at the user device;
- receive, at the user device, additional sound intensity values calculated by a plurality of other user devices in the environment that detect the sound; and
- calculate, at the user device, the location of the source of the sound based at least in part on the first sound intensity value and the additional sound intensity values.

14. The user device of claim 8, wherein the at least one processor is further configured to execute the computer-executable instructions to:
- receive sound data indicative of the sound;
- receive metadata associated with the sound data, wherein the metadata comprises location information indicative of the location of the source of the sound.

15. A computer program product for providing source-of-sound based navigation, the computer program product comprising a non-transitory storage medium readable by a processing circuit, the non-transitory storage medium storing instructions executable by the processing circuit to cause a method to be performed, the method comprising:
- detecting, at a user device, a sound in an environment;
- determining a location of a source of the sound;
- identifying a sound category of the sound;
- performing, based at least in part on the sound category, a contextual analysis of the sound;
- determining, based at least in part on the contextual analysis of the sound, that a visually-impaired user of the user device should be directed away from the location of the source of the sound;
- determining an evacuation path for directing the visually-impaired user away from the source of the sound; and
- generating, on a display of the user device, a tactile representation of the evacuation path.

16. The computer program product of claim 15, the method further comprising:
- generating, on the display of the user device, a tactile representation of a path to avoid from a current location of the user device to the location of the source of the sound,
- wherein the tactile representation of the path to avoid indicates to the visually-impaired user that the path should be avoided, and wherein the tactile representation of the path to avoid is distinguishable by touch of the visually-impaired user from the tactile representation of the evacuation path.

17. The computer program product of claim 16, wherein at least one of:
   i) the tactile representation of the evacuation path comprises a contiguous raised portion of the display of the user device and the tactile representation of the path to avoid comprises a first set of raised portions of the display of the user device and a second set of non-raised portions of the display of the user device, or
   ii) the tactile representation of the evacuation path comprises a contiguous portion of the display of the user device having a first temperature that is distinguishable by the visually-impaired user from a second temperature of other portions of the display of the user device and the tactile representation of the path to avoid comprises one or more portions of the display of the user device having a third temperature that is different from the first temperature.

18. The computer program product of claim 15, wherein determining the evacuation path comprises:
   accessing map data to identify one or more obstacles; and
   constructing the evacuation path so as to avoid the one or more obstacles.

19. The computer program product of claim 15, wherein determining the location of the source of the sound comprises:
   calculating, at the user device, a first sound intensity value of the sound detected at the user device;
   receiving, at the user device, additional sound intensity values calculated by a plurality of other user devices in the environment that detect the sound; and
   calculating, at the user device, the location of the source of the sound based at least in part on the first sound intensity value and the additional sound intensity values.

20. The computer program product of claim 15, the method further comprising:
   receiving sound data indicative of the sound;
   receiving metadata associated with the sound data, wherein the metadata comprises location information indicative of the location of the source of the sound.

* * * * *